United States Patent [19]

Lee

[11] Patent Number: 5,832,237

[45] Date of Patent: *Nov. 3, 1998

[54] PORTABLE COMPUTER SYSTEM AND METHOD FOR CONTROLLING A POWER OF SYSTEM

[75] Inventor: Kyong-kyu Lee, Suwon, Rep. of Korea

[73] Assignee: SamSung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 649,434

[22] Filed: May 17, 1996

[30] Foreign Application Priority Data

May 17, 1995 [KR] Rep. of Korea ................. 95-12235

[51] Int. Cl.$^6$ ................................................ G06F 13/00
[52] U.S. Cl. ................. 395/281; 395/283; 395/750.01
[58] Field of Search .................................. 395/281, 283, 395/750.01

[56] References Cited

U.S. PATENT DOCUMENTS

| | | |
|---|---|---|
| 4,618,779 | 10/1986 | Wiscombe . |
| 4,999,787 | 3/1991 | Mcnally et al. . |
| 5,247,619 | 9/1993 | Mutoh et al. . |
| 5,310,998 | 5/1994 | Okuno . |
| 5,317,697 | 5/1994 | Husak et al. . |
| 5,323,291 | 6/1994 | Boyle et al. . |
| 5,384,492 | 1/1995 | Carlson et al. . |
| 5,394,552 | 2/1995 | Shirota ................................ 395/750 |
| 5,454,080 | 9/1995 | Fasig et al. . |
| 5,486,726 | 1/1996 | Kim et al. . |
| 5,526,493 | 6/1996 | Shu ..................................... 395/281 |
| 5,625,238 | 4/1997 | Ady et al. ........................... 395/283 |
| 5,632,020 | 5/1997 | Gephardt et al. ................... 395/283 |

*Primary Examiner*—Ayaz R. Sheikh
*Assistant Examiner*—David A. Wiley
*Attorney, Agent, or Firm*—Robert E. Bushnell, Esq.

[57] ABSTRACT

The present invention is a method and apparatus pertaining to the safe installation and disconnection of a portable computer from an electrically energized docking station. Ordinarily, the installation of an electrical sub assembly onto an electrically energized system poses a hazard to the electrical components and to data stored in memory because of harmful transient voltages, power surges, and signals produced during engagement and disengagement. The present invention protects the electrical components and data stored in memory by essentially shutting off the power in the portable unit for a brief moment as the portable unit is being either connected to or disconnected from the electrically energized docking station. The above process is accomplished by either using a pair of microswitches or a pair of light emitting/photo detecting units that sequentially toggle during either the installation or the separation process of the portable computer from the docking station. A micro controller inside the portable unit turns off the power to the portable unit for the brief time period between the toggling of the two sensing devices, protecting the portable computer during this crucial time.

18 Claims, 5 Drawing Sheets

PORTABLE COMPUTER SYSTEM AND METHOD FOR CONTROLLING A POWER OF SYSTEM

CROSS-REFERENCE TO RELATED APPLICATIONS

This application makes reference to, incorporates the same herein, and claims all benefits accruing under 35 U.S.C. §119 arising from an application for *Portable Computer System and Method for Controlling a Power of System* earlier filed in the Korean Industrial Property Office on 17 May 1995 and there duly assigned Serial No. 12235/1995.

FIELD OF THE INVENTION

The present invention relates to a method for controlling the operation mode of a docking station and a portable computer having an engagement sensing device so that the engaging operation of a docking station is safely realized by a variable computer operation mode according to the engaging state of a docking station.

BACKGROUND OF THE INVENTION

It is not uncommon for an electrical sub assembly to be either connected to or disconnected to or from an electrically energized host appliance. When such a connection/disconnection occurs, transient voltages and signals can be generated which can cause harm to both the electrical components as well as the data stored in memory. Typically the art has attempted to address this problem by turning off the power to the electrical components and data transmission lines during the brief period when the electrical sub assembly is being engaged to or disengaged from the host.

One recent effort for example, U.S. Pat. No. 5,323,291 for a *Portable Computer and Docking Station Having an Electromechanical Docking/Undocking Mechanism and a Plurality of Cooperatively Interacting Failsafe Mechanisms* to Boyle discloses a portable computer docking station with a portable computer. The portable computer contains a power supply and a microcontroller able to sense contact to a sense pin. Boyle '291 provides electrical safety features that protect data and components during docking and undocking, and uses a microcontroller connected to a sense pin to sense whether docking has begun. Once this sense pin is contacted, the micocontroller waits for an 'on' button or 'on' key to be pressed. Upon receiving this 'on' signal, the docking station power is turned on while the power in the main system controller and the bus are put into a quiescent state while the power in the central processing unit in the portable computer remains off until docking is complete and electrical stabilization has resumed. Only when docking and stabilization are complete is the power fully restored to the main system controller, the bus, and the portable computer including the CPU. This process is also required in reverse for detachment. In Boyle, the docking station power must be off before docking begins. If it is on, a power failure warning signal will shut the power in the docking station down so that docking can occur. In Boyle, a user must press an 'on' button or turn an 'on' key during docking.

Another example is found in U.S. Pat. No. 5,454,080 for a *Removable Hard Disk Drive System with Circuit For Hot Insertion and Removal Responsive to Contacts of Zero-Insertion-Force Connector on the Lateral Side of the Drive* to Fasig et al. Which contemplates "hot-plugging" a hard disk drive into a computer system. The bus of the computer has a "lock-out" feature which prevents writing onto the removable hard disk drive until the computer system has been subsequently rebooted.

U.S. Pat. No. 5,247,619 for *Insertion and Removal of a Circuit Device into a Bus Network* to Mutoh et al, pertains to the protection of a bus network and the signals transmitted on the bus network when a circuit device or circuit board is either being inserted or removed from the network. Mutoh '619 recognizes that the insertion or removal of a circuit element from a bus network creates the risk of producing faulty, harmful, transient signals on the bus network. In order to protect the network from receiving these faulty unwanted signals, a signal is generated upon either the start of insertion or the start of removal to interrupt the bus until the insertion or removal is complete and stable electrical conditions return. This "interrupt" signal prevents the transmittal of these unwanted faulty signals from destroying the databases.

U.S. Pat. No. 5,317,697 for a *Method and Apparatus for Live Insertion and Removal of Electronic Sub-Assemblies* to Husak et al, attempts to protect the system power supply when a sub assembly is either inserted or removed from a powered electronic system. Sequential mating and disconnection is employed whereby the first connection/disconnection alerts circuits that an installation and disconnection is underway. During this time, a MOSFET transistor either ramps up or ramps down the power to the subassembly, avoiding the risk of harmful transient effects and power surges to the circuit.

U.S. Pat. No. 5,384,492 for a *Protective System for Insertion/Extraction of PC Boards in a Powered-Up Environment* to Carlson et al. connects and disconnects a printed circuit board from an actively electrically energized backplane with sequential mating of pins, field effect transistors, and circuit design allow the printed circuit card to be connected/disconnected from a powered-up circuit without experiencing the ill transient effects. The field effect transistors allow the power to be ramped up and down, eliminating destructive power surges, latch-ups, arcing, voltage glitches, error signals, reversals of logic, and the generation of corrupt data, which would otherwise occur if there was no protection.

U.S. Pat. No. 4,999,787 for a *Hot Extraction and Insertion of Logic Boards in an On-Line Communication System* to McNally et al, attempts to permit a hot insertion or extraction of a logic board from a data communications system. A power umbilical cord is connected to the card to be removed and the card to be inserted, a "hot insert" button is depressed, and the physical switching takes place. The "hot insert" button interrupts the bus temporarily preventing the occurrence of faulty data glitches produced by the transition. The power umbilical cord to the boards prevents arcing, logic spikes, and power surges when a board is installed or removed, so that when the new board is eventually connected to the system power supply, the transient effects of turning the power on to the board are reduced or eliminated.

U.S. Pat. No. 5,310,998 for a *Method and System for Placing a Bus on Hold During the Insertion/Extraction of an IC Card Into/From a Computer* to Okuno describes a method and apparatus for inserting or extracting an IC card from a lap-top type personal computer. Without protection, insertion/extraction of an IC card on a lap-top PC with the power on could cause the CPU to hang up. To prevent this, an initial signal created at the start of connection/disconnection for extraction, puts the bus on hold, preventing the occurrence of having the CPU hang up.

U.S. Pat. No. 4,618,779 for a *System for Parallel Power Supplies* to Wiscombe describes a system and circuit for connecting power supplies in parallel. Each power supply has a sensing line connected to a load to sense whether the power supply is being overloaded or not. A controller controls variable load resistors which cause the load of each power supply to vary depending upon the sensed current from each power supply. The resultant circuit is a more stable circuit with no power surges or glitches.

Despite all of these efforts, no computer docking station has sought to protect the components and data when a portable computer is docked onto a docking station while the docking station has the power on.

SUMMARY OF THE INVENTION

It is therefore an object of the present invention to provide an improved docking process and station.

It is another object to provide a method and apparatus that protects the electrical components and data of a portable computer while a portable computer is being docked onto undocked from an electrically energized docking station.

It is yet another object to provide a docking station and portable computer assembly that can sense, using microswitches connected to a microcontroller, whether the portable computer is either being docked to or undocked from the docking station.

It is still another object to provide a docking station and portable computer assembly that can sense, using light emitting diodes and photo detectors, whether the portable computer is either being docked to or undocked from the docking station.

It is still yet another object to provide a portable computer with a microcontroller that can briefly turn off the power in the portable computer upon docking and undocking from an electrically energized docking station in order to protect components and data in the portable computer based on input signals from either microswitches or photodetectors that sense whether the portable computer is being docked onto or removed from the electrically energized docking station.

These and other objects of the invention may be achieved by a portable computer that contains a sensing mechanism that can sense whether or not the portable computer is being docked onto or removed from a docking station, by supplying signals generated by these sensing mechanisms to input ports on a microcontroller internal to the portable computer, and by essentially turning off the power in the portable computer by a signal generated by the microcontroller internal to the portable computer for the brief time while the portable computer is being docked onto or removed from the electrically energized docking station. The sensing mechanisms can be either a pair of microswitches that close upon docking, or a pair of photoemitter/photodetector pairs that conduct upon docking. When the microcontroller determines via signals generated by the sensing mechanisms that the portable computer is being docked onto or undocked from the docking station, the controller puts the portable computer to sleep by turning off all the power delivered to the portable computer except for a small amount of power to run the microcontroller internal to the portable computer. As a result, electrical components inside the portable computer and data stored in the portable computer are not injured during the brief docking or undocking process.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
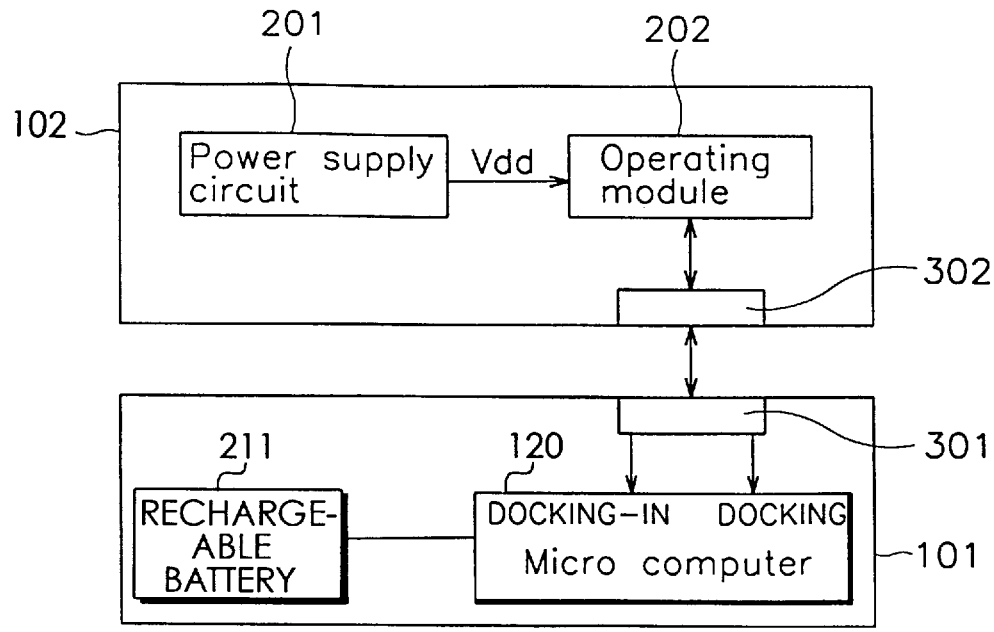
FIG. 1 is a block diagram of a portable computer and an abstract representation of the salient features of a hypothetical typical docking station.
Figure 6:
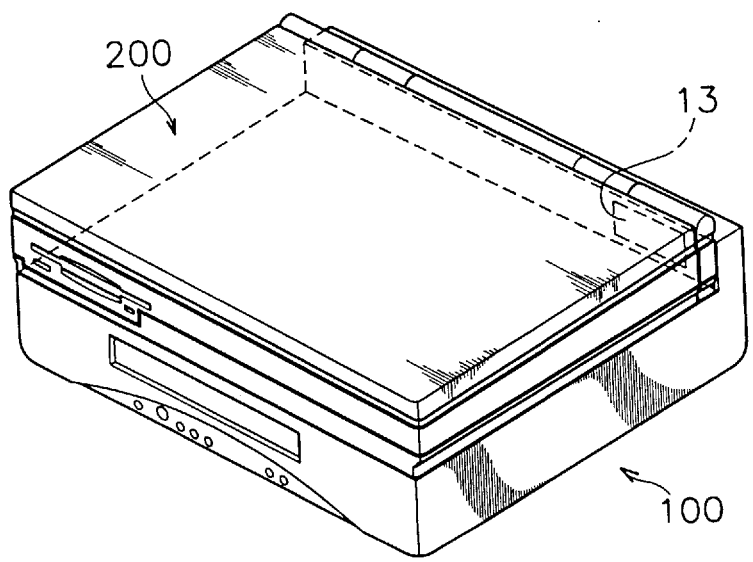
FIG. 6 is a state diagram of engaging a portable computer and a docking station in accordance with a preferred embodiment of the present invention.

Referring to FIG. 1, a docking station 102 includes a power supply circuit 201 which supplies power Vdd and an operating module 202 which executes a control operation. A portable computer 101 can be mounted to and removed from docking station 102 by engaging connector 301 formed in portable computer body 101, embedding a micro computer 120, to connector 302 formed in docking station 102. While docked onto docking station 102, portable computer is powered by power supply circuit 201 found in docking station 102 while battery 211, internal to portable computer 101 is recharged. The operating module 202 performs a corresponding function according to an input/output control signal from the micro computer 120 when connectors 301 and 302 are properly connected. When undocked, portable computer 101 is powered by battery 211 while docking station remains electrically energized by power supply circuit 201. In case of expanding the portable computer functions by using the docking station 102, the power Vdd of the docking station 102 and the portable computer body 101 may be in an off-state when mounting/removing the portable computer body 101 to/from the docking station 102. If mounting or removing is performed under the condition that the power Vdd of either of the docking station 102 or the portable computer body 101 is in an on-state, a leakage current flows from an on-state unit to an off-state unit posing a threat to electrical components found within and data stored within the off-state unit. To mount the docking station 102 while in an on-state requires additional circuits which brings about additional cost to the production of the docking station 102.

Figure 2:
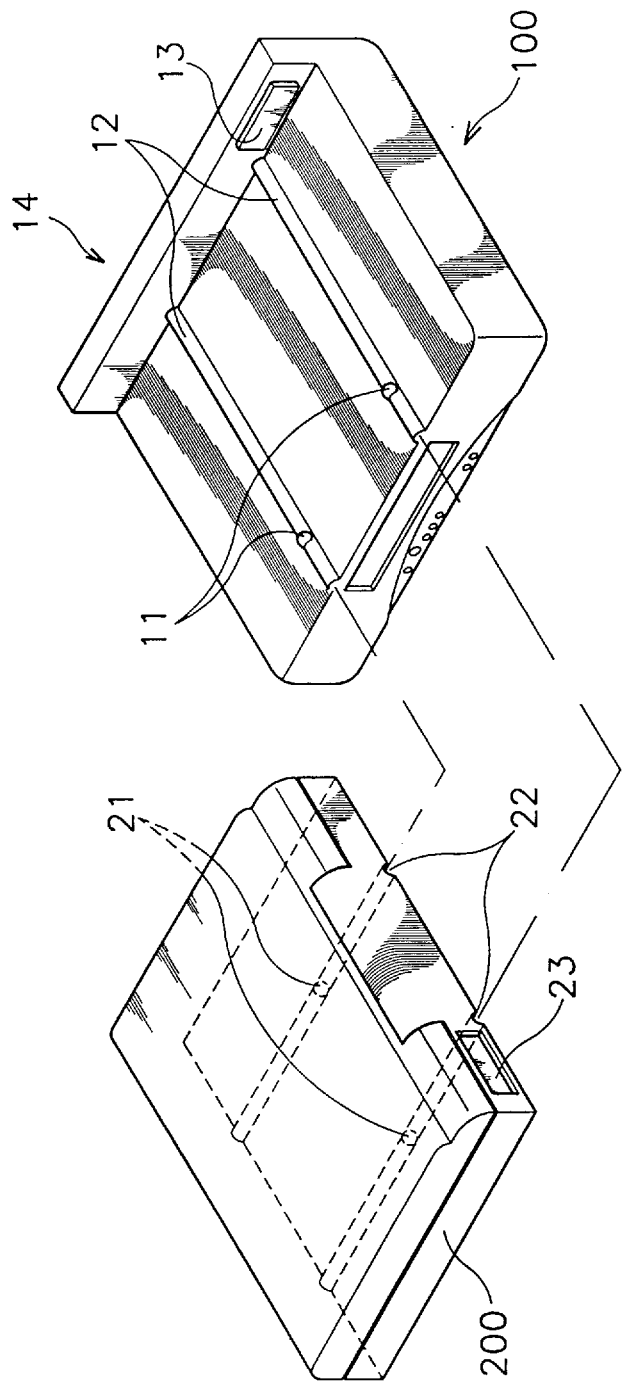
FIG. 2 is a schematic diagram of an engaging device of a docking station constructed according to the principles of the present invention.

As shown in FIG. 2, the embodiment of the present invention includes a docking station 100 providing expanded operating functions and having an engaging member, and a portable computer 200 having an engaging member in order to be connected to the docking station 100. The docking station 100 includes two projected linear guides 12 formed in the upper side of the docking station 100, a contact member 11 formed in the projected guide 12 and a connector 13 formed in a sidewall 14 of the docking station 100. The portable computer 200 includes a contact member 21 which connects with the contact member 11, two indented linear guides 22 fitting the projected guides 12 of the docking station 100 to slide the portable computer 200 from the front to the rear of the docking station 100, and a connector 23 which connects to the connector 13 of the docking station 100. When the portable computer 200 is connected to the docking station 100, the portable computer 200 is mounted on the docking station 100. The guides 22 of portable computer 200 fit into projected guides 12 of the docking station 100. The portable computer 200 slides along the guides 12 and contact members 11 and 21 comes in contact with each other. After contact members 11 and 21 connect, connector 23 of the portable computer 200 is inserted into connector 13 of docking station 100. When portable computer 200 is separated from docking station 100, the sequence is in reverse order.

Figure 3:
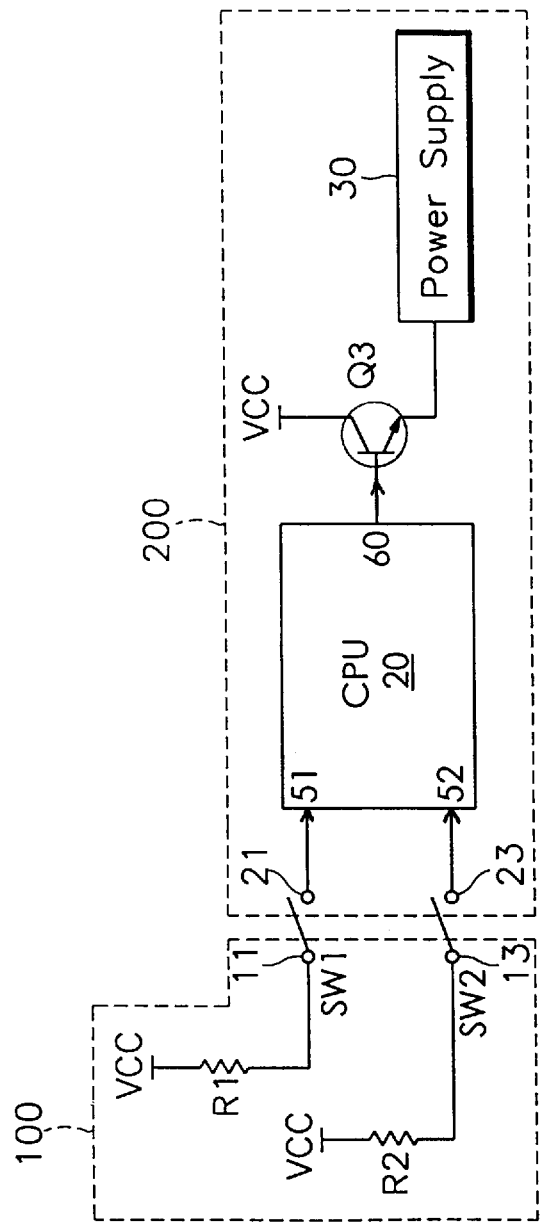
FIG. 3 is a block diagram of a detecting device for an engaging state of the docking station, constructed in accordance with the first embodiment of the present invention.
Figure 4:
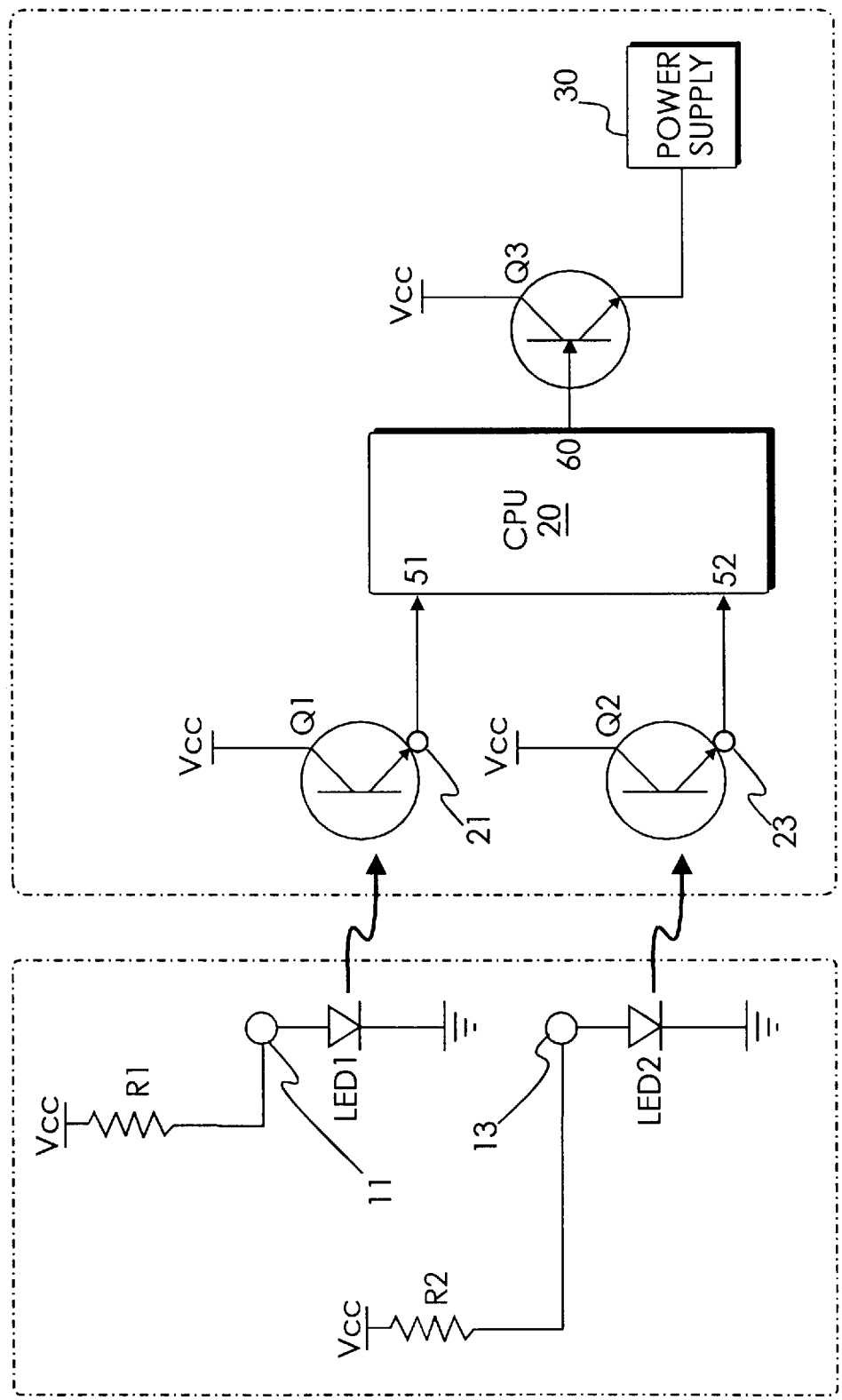
FIG. 4 is a block diagram of a detecting device for an engaging state of the docking station, constructed in accordance with the second embodiment of the present invention.

As shown in FIGS. 3 and 4, docking station 100 contains resistor R1 having one end connected to power source Vcc supplied from the outside, and the other end connected to contact member 11. Docking station 100 also contains resistor R2 having one end connected to power source Vcc supplied from the outside, and the other end connected to connector 13. Portable computer 200 includes a central processing unit (hereinafter, CPU) 20 having a first input port 51 connected to contact member 21, a second input port 52 connected to connector 23, and output port 60 connected to the base of transistor Q3. The collector of Q3 is connected to power source Vcc, and the emitter of Q3 is connected to power supply 30.

The first embodiment, depicted by FIG. 3 show contact members 11 and 21 making up switch SW1 while connectors 13 and 23 make up switch SW2. CPU 20 can detect whether SW1 is open or closed by sensing the voltage at input port 51. Similarly, CPU 20 can detect whether SW2 is open or closed by sensing the voltage at input port 52.

Figure 5:
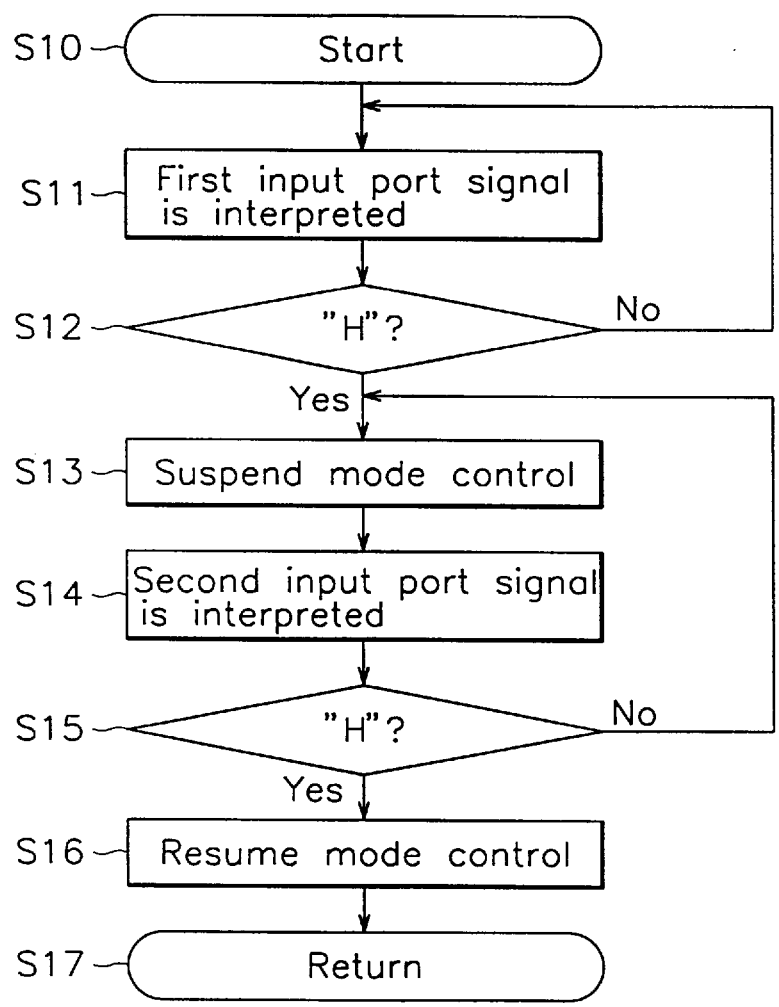
FIG. 5 is a flow chart of the operation of central processing unit during docking in accordance with a preferred embodiment of the present invention.

The docking of portable computer 200 onto docking station 100 will now be described according to the first embodiment of the present invention shown in FIG. 3. Initially, portable computer 200 is separate from docking station 100. When completely separated, "low" voltages are sensed by first and second input ports 51 and 52 respectively of CPU 20. When separate from docking station 100, portable computer 200 is fully operational as it is powered by an internal battery represented as power supply 30 in FIG. 3, and as is illustrated by steps S10 and S11 in FIG. 5 and by the first entry of Table 1.

TABLE 1

| SW1 (11/21) | SW2 (13/23) | Situation | O3 and power supply 30 |
|---|---|---|---|
| open | open | portable computer 200 Is separated from Docking station 100 | power is "on" Portable Computer 200 runs of internal battery |
| closed | open | portable computer 200 Is either being docked Or undocked from Docking station 100 | Power is in "suspend" mode for portable computer 200. Essentially, power isoff |
| closed | closed | portable computer 200 Is fully docked onto Docking station 100 | Power is "on" Portable computer 200 draws power from docking station 100. Battery inside portable Computer 200 is being Recharged. |
| open | closed | never occurs | never occurs |

When docking begins, the rear side of portable computer 200 is slid onto docking station 100 and guides 12 of docking station 100 guide indented linear guides 22 of portable computer 200 onto docking station 100. As this occurs, contact member 11 of docking station 100 make contact with contact member 21 of portable computer 200. As this contact is made, switch SW1 in FIG. 3 closes causing Vcc to supply a "high" voltage to first input port 51 of CPU 20. When CPU 20 detects that the "high" voltage at first input port 51 in step S12 in FIG. 5, CPU 20 disables the power supply to portable computer 200, and as is shown by the second entry in Table 1 and by step S13 in FIG. 5. This disablement is caused by CPU 20 outputting a signal through output port 60 to the base of transistor Q3, turning off power supply 30 of portable computer 200. Since it was the internal battery that was originally delivering power to portable computer 200 when portable computer 200 was detached from docking station 100, it is this internal battery that becomes temporarily disabled. In other words, portable computer goes from an "operational" mode into a "suspend" or "sleep" mode, cutting all power delivered to portable computer 200 except for a small, quiescent power to run CPU 20. By turning the power essentially off inside portable computer 200, the electrical components and the data stored in memory in portable computer 200 will not be destroyed or harmed by transient voltages and currents produced during the attachment to an electrically energized device.

Referring again to FIG. 2, as portable computer 200 continues to be slid onto docking station 100, the rear of portable computer 200 approaches sidewall 14 of docking station 100. Portable computer 200 is completely docked onto docking station 100 when the rear of portable computer 200 makes contact with sidewall 14 of docking station 100. As this occurs, a second electrical contact is made between docking station 100 and portable computer 200. This second and final contact occurs when connector 13 of docking station 100 makes electrical contact with connector 23 of portable computer 200. As this second electrical contact is made, switch SW2 is closed. When switch SW2 is closed, power supply Vcc sends a "high" voltage signal to second input port 52 of CPU 20. When CPU 20 senses that both input ports 52 and 51 have "high" voltages as in steps S14 and S15 of FIG. 5, CPU 20 sends a signal via output port 60 to the base of transistor Q3 causing power supply 30 to turn "on", causing portable computer 200 to switch from "suspend" mode to "resume" mode, as is shown by the third entry in Table 1 and by step S16 in FIG. 5. Portable computer 200, now docked onto docking station 100, is powered from docking station 100, as the battery internal to portable computer 200 is being recharged by docking station 100. The risk of damage to the electrical components and to the data in memory is over as normal processing resumes.

Undocking under the first embodiment is the reverse of the docking process. As portable computer 200 is pulled from docking station 100, the first connector to become disconnected is connector 23 of portable computer 200 from connector 13 of docking station 100. This causes switch SW2 to open, causing a "low" voltage to be sensed at second input port 52 of CPU 20, causing output 60 of CPU 20 to turn off transistor Q3, causing power supply 30 to essentially turn "off" by going into a "suspend" mode. The "suspend" mode insures that no power is supplied to portable computer 200 during undocking except for a small amount of power to run CPU 20. As with docking, "suspend" mode during undocking protects the electrical components and the data stored in memory in portable computer 200 from being harmed by transient voltage glitches and power surges that can occur when a device is electrically separated from an electrically energized master device.

While in "suspend" mode, undocking continues until portable computer 200 becomes completely separated from docking station 100. As this occurs, connector 21 of portable computer 200 becomes disconnected from connector 11 of docking station 100. This causes switch SW1 to open, causing the voltage at first input port 51 of CPU 20 to go from "high" to "low". When CPU senses that both input port voltages 52 and 51 are "low", CPU 20 realizes that portable computer 200 is completely separated from docking station 100 and that the electrical components and data in memory no longer need to be protected. This is accomplished by sending an output signal via output port 60 of CPU 20 to the base of transistor Q3 to turn on transistor Q3 so that power supply 30 of portable computer 200 may be enabled. Once again, portable computer 200 is now fully functional as it is no longer in "suspend" mode but is now in "resume" mode. Since portable computer 200 is now separated from docking station 100, portable computer 200 is powered by a battery internal to portable computer 200 that was recharged when portable computer 200 was docked onto docking station 100.

The present invention contains a second embodiment that is shown by FIG. 4. In the second embodiment, switch SW1 is replaced by LED1 and photodetector Q1, and switch SW2 is replaced by LED2 and photodetector Q2. LED1 and LED 2 are mounted on docking station 100, while photodetectors Q1 and Q2 are mounted on portable computer 200. The collectors of Q1 and Q2 are connected to voltage Vcc while the emitters of photodetectors Q1 and Q2 are connected to first input port 51 and second input port 52 respectively of CPU 20. When portable computer 200 is docked onto docking station 100, LED1 and LED2 emit radiation that is detected by the base of photodetector transistors Q1 and Q2 respectively, turning Q1 and Q2 to an "on" or "conduction" state. In this "on" state, a "high" voltage signal is delivered to input ports 51 and 52 respectively of CPU 20. When portable computer 200 is disconnected from docking station 100, Q1 and Q2 do not receive the radiation emitted by LED1 and LED2, causing Q1 and Q2 to turn "off". When Q1 and Q2 are "off", a "low" voltage signal is delivered to input ports 51 and 52 respectively. During docking and undocking, Q1 is turned on by light emitted from LED1, while Q2 is turned "off" because Q2 is unable to detect the light emitted by LED2. When this occurs, first input port 51 of CPU 20 senses a "high" voltage while second input port 52 of CPU 20 senses a "low" voltage. As with the first embodiment, this causes CPU 20 to shut off transistor Q3, causing power supply 30 to be turned off as portable computer 200 goes into a "suspend" mode. As with the first embodiment, this "suspend" mode protects the electrical components and the data stored in memory from potentially harmful transient voltages often produced during the docking and undocking of a subassembly from an electrically energized appliance.

Since the power state is controlled by the operation mode of a computer after the engaging operation of the docking station, the engaging operation of the docking station must be executed safely. And, the engaging operation of the docking station reduces the consumption of the unnecessary power when the operation is not normal.

What is claimed is:

1. A portable computer system, comprising:
   a first guide mounted on a top surface of a docking station;
   a second guide mounted on a bottom surface of a portable computer for cooperating with said first guide to guide movement of said portable computer onto said docking station during a docking operation;
   first switching means mounted on a predetermined location along said first guide of said docking station and along said second guide of said portable computer respectively, for outputting a first signal when said portable computer is initially mounted onto said docking station from an initial contact position for said docking operation to a fully engaged position with said docking station;
   second switching means mounted on said docking station and said portable computer, and spaced-apart from said first guide of said docking station and said second guide of said portable computer respectively, for outputting a second signal when said portable computer is fully docked onto said docking station in said filly engaged position with said docking station during said docking operation;
   control means having first and second input ports coupled to respectively receive said first signal and said second signal, for outputting a third signal exhibiting a first logic state indicating a request to convert operation of said portable computer into a suspend mode in response to reception of said first signal and a second logic state indicating a request to resume operation of said portable computer from said suspend mode in response to reception of said second signal;
   third switching means for controlling electrical power supplied by the docking station for the operation of said portable computer in dependence upon said third signal; and
   a power supply supplying the electrical power for the operation of said portable computer in dependence upon operation of said third switching means.

2. The portable computer system of claim 1, wherein each of said first switching means and said second switching means is comprised of a micro switch that changes a conduction state of said first signal and said second signal.

3. The portable computer system of claim 1, wherein each of said first switching means and said second switching means is comprised of a photo sensor that changes a conduction state of said first signal and said second signal depending on whether an emitted light is detected.

4. The portable computer system of claim 1, wherein said control means senses said first signal from said first switching means at said first input port to output said third signal exhibiting said first logic state to said third switching means for cutting power supplied to said portable computer, and senses said second signal from said second switching means at said second input port to output said third signal exhibiting said second logic state to said third switching means for resuming power supplied to said portable computer.

5. A method of protecting electronic components and data from destructive transient signals and voltages produced during the docking and undocking of a portable computer to or from an electrically energized docking station, comprising:
   providing a docking station having a front side and a rear side opposite to said front side;
   providing a portable computer having a front side and a rear side opposite to said front side;
   sensing the initiation of said docking or undocking of said portable computer when, during docking, said rear side of said portable computer is on said front side of said docking station, and during undocking, said rear side of said portable computer becomes separated from said rear side of said docking station;
   generating a first input signal to a controller in said portable computer indicating the initiation of said docking or undocking of said portable computer to or from said docking station;

disabling a power supply in said portable computer by to a first output signal generated from said controller in response to said first input signal preventing to prevent damage to said electrical components and said data caused by said transient signals and voltages produced during said docking and undocking of said portable computer to or from said docking station;

sensing the completion of said docking or undocking of said portable computer when, during undocking, said rear side of said portable computer is on said front side of said docking station, and during docking, said rear side of said portable computer becomes joined with said rear side of said docking station;

generating a second input signal to said controller in said portable computer indicating the completion of said docking or undocking of said portable computer from said docking station; and restoring power to said portable computer by a second output signal generated from said controller in response to said second input signal.

6. A computer system comprising a docking station and a portable computer that can safely dock onto and undock from said docking station when said docking station is electrically energized, without causing destruction to electrical components or to data in said portable computer caused by transient signals and voltages produced during docking and undocking, further comprising;

first and second sensing means disposed at different locations along a docking direction of said portable computer and said docking station respectively, to detect the start and completion of the docking and undocking of said portable computer from said docking station;

controlling means in said portable computer which receives input signals from one of said first and second sensing means that indicate one of said start and said completion of said docking and undocking of said portable computer to and from said docking station, and outputs signals that either electrically energizes said portable computer or cuts power delivered to said portable computer based on said input signals; and a power supply internal to said portable computer that electrically energizes said portable computer before said start of said docking to said docking station and after said completion of said undocking from said docking station.

7. The computer system of claim 6, wherein said first and second sensing means during docking correspond to two micro switches that close in sequence, causing two corresponding voltage signals to be input as said input signals to said controlling means in said sequence.

8. The computer system of claim 7, wherein said first and second sensing means during undocking correspond to two micro switches that open in sequence, causing the disconnection in said sequence of said two corresponding voltage signals as said input signals to said controlling means.

9. The computer system of claim 8, wherein said first and second sensing means during said docking correspond to two light emitting diodes on said docking station that activate corresponding ones of two photo detectors mounted on said portable computer in sequence, generating said input signals to said controlling means that indicate said start and said completion of said docking of said portable computer to and from said docking station.

10. The computer system of claim 9, wherein said first and second sensing means during said undocking correspond to two light emitting diodes on said docking station that separate from corresponding ones of two photo detectors mounted on said portable computer in sequence, causing said corresponding ones of said two photo detectors mounted on said portable computer to deactivate in sequence causing the disconnection in said sequence of said two corresponding input voltage signals as said input signals to said controlling means.

11. The computer system of claim 6, wherein said portable computer is electrically energized from said docking station after said completion of said docking and before said start of said undocking.

12. The computer system of claim 6, wherein said portable computer is electrically energized from a battery internal to said portable computer after said completion of said undocking and before said start of said docking.

13. The computer system of claim 12, wherein said battery internal to said portable computer is recharged from said docking station after said completion of said docking and before said start of said undocking.

14. A portable computer system, comprising:

a docking station having a front portion and a rear portion separated by a distance;

guide means defining a path of travel for accommodating movement of a portable computer along said path of travel on said docking station during a docking operation;

first switching means mounted in the front portion of said docking station along said path of travel, for outputting a first signal in accordance with a distance said portable computer is slid onto said docking station;

second switching means mounted in the rear portion of said docking station along said path of travel, for outputting a second signal in accordance with a distance said portable computer is slid onto said docking station;

control means connected to the first and second switching means, for selectively applying power and interrupting power to the portable computer;

wherein as the portable computer is initially slid onto the docking station, said first switching means is activated causing said control means to interrupt power supplied to the portable computer; and wherein as the portable computer is fully slid into the docking station, said second switching means is activated causing said control means to apply power to the portable computer.

15. The portable computer of claim 14, wherein said control means comprises a microcomputer connected to the first and the second switching means, for generating a first output in response to activation of said first switching means and for generating a second output in response to activation of said second switching means.

16. The portable computer of claim 15, further comprising a power switch connected to said microcomputer for interrupting power to the portable computer in response to said first output of said microcomputer, and for applying power to the portable computer in response to said second output of said microcomputer.

17. The portable computer system of claim 16, wherein said first switching means and said second switching means each is comprised of a micro switch that changes a conduction state of the corresponding first and second signals.

18. The portable computer system of claim 16, wherein said first switching means and said second switching means each is comprised of a photo sensor that changes a conduction state of the corresponding first and second signals depending on whether an emitted light is detected.

* * * * *